United States Patent
Line et al.

(10) Patent No.: US 9,932,012 B1
(45) Date of Patent: Apr. 3, 2018

(54) INNER CARRIER AND BACK PANEL HAVING ALTERNATING TRIM AND SIDE AIRBAG ATTACHMENTS

(71) Applicant: Ford Global Technologies, LLC, Dearborn, MI (US)

(72) Inventors: Johnathan Andrew Line, Northville, MI (US); Marcos Silva Kondrad, Macomb, MI (US); Christian J. Hosbach, Taylor, MI (US); Nicholas Alphonse Billardello, Macomb, MI (US); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/382,771

(22) Filed: Dec. 19, 2016

(51) Int. Cl.
| | |
|---|---|
| *B60R 21/207* | (2006.01) |
| *B60N 2/70* | (2006.01) |
| *B60N 2/72* | (2006.01) |
| *B60N 2/68* | (2006.01) |
| *B60N 2/58* | (2006.01) |
| *B60R 21/00* | (2006.01) |

(52) U.S. Cl.
CPC .......... *B60R 21/207* (2013.01); *B60N 2/5825* (2013.01); *B60N 2/5841* (2013.01); *B60N 2/682* (2013.01); *B60N 2/686* (2013.01); *B60N 2/7017* (2013.01); *B60N 2/72* (2013.01); *B60R 2021/0006* (2013.01)

(58) Field of Classification Search
CPC .... B60N 2/686; B60N 2/5841; B60N 2/5895; B60R 21/207
See application file for complete search history.

(56) References Cited

U.S. PATENT DOCUMENTS

| | | | |
|---|---|---|---|
| 5,586,807 A * | 12/1996 | Taggart ................ | B60N 2/5825 24/336 |
| 5,799,970 A * | 9/1998 | Enders ................. | B60R 21/207 280/728.2 |
| 5,979,979 A * | 11/1999 | Guerinot .............. | B60N 2/5825 297/216.1 |

(Continued)

FOREIGN PATENT DOCUMENTS

| | | | | |
|---|---|---|---|---|
| DE | 10203646 A1 * | 8/2003 | .......... | B60N 2/5825 |
| DE | 102011116634 A1 * | 4/2013 | .......... | B60N 2/5825 |

(Continued)

*Primary Examiner* — Nicole T Verley
(74) *Attorney, Agent, or Firm* — Vichit Chea; Price Heneveld LLP

(57) ABSTRACT

A vehicle seating assembly includes a seatback. A seatback panel is operably coupled with a back side of the seatback. The seatback panel includes a front side and a rear side. Multiple laterally-extending mounting features are disposed proximate edges of the front side of the seatback panel. An inner carrier includes multiple clip embossments extending laterally and releasably coupled with the mounting features. Multiple forwardly-extending clip towers are spaced vertically between the mounting features. A cushion assembly includes attachment features releasably coupled with the clip towers. After deployment of an airbag module, the mounting features of the seatback panel and the clip embossments can be recoupled for continued use of the vehicle seating assembly.

20 Claims, 8 Drawing Sheets

(56) References Cited

U.S. PATENT DOCUMENTS

| | | | | |
|---|---|---|---|---|
| 6,386,577 | B1* | 5/2002 | Kan | B60R 21/207 280/728.1 |
| 7,195,274 | B2* | 3/2007 | Tracht | B60R 21/207 280/728.3 |
| 7,267,363 | B2* | 9/2007 | Tredez | B60R 21/207 280/728.3 |
| 7,393,005 | B2* | 7/2008 | Inazu | B60N 2/5825 280/728.2 |
| 7,441,797 | B2* | 10/2008 | Tracht | B60R 21/207 280/730.2 |
| 7,641,281 | B2* | 1/2010 | Grimm | B60N 2/449 297/216.13 |
| 7,850,247 | B2* | 12/2010 | Stauske | B60N 2/5621 297/452.24 |
| 8,608,191 | B2* | 12/2013 | Dainese | A41D 13/018 280/730.1 |
| 8,690,257 | B2* | 4/2014 | Stiller | B60N 2/5825 24/297 |
| 8,807,594 | B2* | 8/2014 | Mizobata | B60N 2/6009 280/730.2 |
| 8,905,431 | B1* | 12/2014 | Line | B60R 21/215 280/728.2 |
| 8,960,791 | B2* | 2/2015 | Dry | B60N 2/44 297/218.1 |
| 9,161,635 | B2* | 10/2015 | Toribuchi | A47C 31/023 |
| 9,283,880 | B2* | 3/2016 | Taniguchi | B29C 37/0032 |
| 9,302,643 | B2* | 4/2016 | Line | B60N 2/58 |
| 9,554,602 | B2* | 1/2017 | Dainese | A41D 13/018 |
| 9,616,790 | B2* | 4/2017 | Stankiewicz | B60N 2/5825 |
| 9,649,963 | B2* | 5/2017 | Line | B60N 2/64 |
| 9,707,873 | B2* | 7/2017 | Line | B60N 2/503 |
| 2006/0113751 | A1* | 6/2006 | Tracht | B60N 2/5825 280/728.2 |
| 2006/0163850 | A1* | 7/2006 | Inazu | B60N 2/5825 280/730.2 |
| 2006/0279074 | A1* | 12/2006 | Tracht | B60R 21/207 280/730.2 |
| 2007/0057493 | A1* | 3/2007 | Ritzel | B60N 2/58 280/730.2 |
| 2007/0080523 | A1* | 4/2007 | Sugimoto | B60R 21/207 280/730.1 |
| 2008/0100044 | A1* | 5/2008 | Cho | B60R 21/207 280/730.2 |
| 2008/0224509 | A1* | 9/2008 | Demick | B60N 2/5825 297/218.2 |
| 2009/0121528 | A1* | 5/2009 | Oku | B60N 2/5825 297/218.5 |
| 2009/0200775 | A1* | 8/2009 | Sugimoto | B60R 21/207 280/730.2 |
| 2011/0095513 | A1* | 4/2011 | Tracht | B60N 2/5816 280/730.2 |
| 2011/0121624 | A1* | 5/2011 | Brncick | B60N 2/0232 297/284.2 |
| 2012/0007344 | A1* | 1/2012 | Dainese | A41D 13/018 280/728.1 |
| 2012/0038200 | A1* | 2/2012 | Stankiewicz | B60N 2/5825 297/452.59 |
| 2012/0292976 | A1* | 11/2012 | Ursino | B60N 2/5825 297/452.48 |
| 2013/0320742 | A1* | 12/2013 | Murolo | B60N 2/68 297/452.18 |
| 2014/0070594 | A1* | 3/2014 | Awata | B60N 2/5825 297/452.48 |
| 2015/0251579 | A1* | 9/2015 | Line | B60N 2/64 297/452.18 |
| 2015/0283970 | A1* | 10/2015 | Line | B60N 2/58 280/728.3 |
| 2015/0307001 | A1* | 10/2015 | Sahashi | B60N 2/5825 297/218.2 |
| 2016/0009209 | A1* | 1/2016 | Cao | B60N 2/4802 297/354.12 |
| 2016/0114751 | A1* | 4/2016 | Saito | B60R 21/2176 297/216.13 |
| 2016/0257276 | A1* | 9/2016 | Line | B60N 2/68 |
| 2017/0008436 | A1* | 1/2017 | Wyatt | B60N 2/5825 |
| 2017/0305377 | A1* | 10/2017 | Yoo | B60R 21/207 |

FOREIGN PATENT DOCUMENTS

| | | | | |
|---|---|---|---|---|
| DE | 102014222085 | A1* | 5/2016 | B60N 2/5825 |
| FR | 2992597 | A1* | 1/2014 | B60N 2/5825 |

* cited by examiner

INNER CARRIER AND BACK PANEL HAVING ALTERNATING TRIM AND SIDE AIRBAG ATTACHMENTS

FIELD OF THE DISCLOSURE

The present disclosure generally relates to a vehicle seating assembly, and more particularly to an inner carrier and back panel having alternating trim and side airbag attachments for a vehicle seating assembly.

BACKGROUND OF THE DISCLOSURE

It is becoming increasingly more common for vehicles to include airbag assemblies in locations that allow the contained airbag to deploy to desired areas of protection quickly and with a high degree of precision. It is generally understood that one location airbag assemblies are more frequently incorporated is within a seatback for deploying between a passenger and an adjacent vehicle door. Typically, these side airbags are encased within the fabric upholstery material of the seatback, such that upon deployment of the airbag the upholstery material is torn. This form of deployment may result in inconsistent airbag deployment and substantial damage to the seatback. As vehicle seats are equipped with airbag assemblies, it is also becoming desirable to decrease the overall volume of vehicle seats for reducing weight and providing adequate space for the passengers within the vehicle.

SUMMARY OF THE DISCLOSURE

According to one aspect of the present disclosure, a vehicle seating assembly includes a seatback. A seatback panel is operably coupled with a back side of the seatback. The seatback panel includes a front side and a rear side. Multiple laterally-extending mounting features are disposed proximate edges of the front side of the seatback panel. An inner carrier includes multiple clip embossments extending laterally and releasably coupled with the mounting features. Multiple forwardly-extending clip towers are spaced vertically between the mounting features. A cushion assembly includes attachment features releasably coupled with the clip towers. After deployment of an airbag module, the mounting features of the seatback panel and the clip embossments can be recoupled for continued use of the vehicle seating assembly.

According to another aspect of the present disclosure, a vehicle seating assembly includes a seatback panel. Multiple laterally-extending mounting features are defined on first and second sides of the seatback panel. An inner carrier includes multiple bulbous carrier flanges extending laterally and releasably coupled with the mounting features. Multiple forwardly-extending clip towers are spaced between the mounting features. A cushion assembly includes clip retainers releasably coupled with the clip towers.

According to yet another aspect of the present disclosure, a method of making a vehicle seating assembly includes providing a seatback panel. Laterally-extending attachment features are defined on the seatback panel. An inner carrier is provided. Laterally-extending bulbous carrier flanges with the attachment features are releasably coupled. Multiple forwardly-extending clip towers are spaced between the attachment features. Clip retainers of a cushion assembly are releasably coupled with the clip towers. After deployment of an airbag, the attachment features of the seatback panel are recoupled with the bulbous carrier flanges.

Still another aspect of the present disclosure includes a vehicle seating assembly having a seatback panel with a plurality of mounting features defined on sides of the seatback panel. An inner carrier is provided that includes multiple attachment features spaced alongside to the inner carrier. The attachment features and the mounting features cooperate to define a space through which an airbag is deployed by an airbag module. S-shaped clips on the seatback panel are releasably coupled with bulbous carrier flanges on the inner carrier. Accordingly, after deployment of the airbag from the airbag module, the S-shaped clips can be re-coupled with the bulbous carrier flanges of the mounting features. The assembly provides a robust and reusable assembly that is efficient to make and safe to use.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
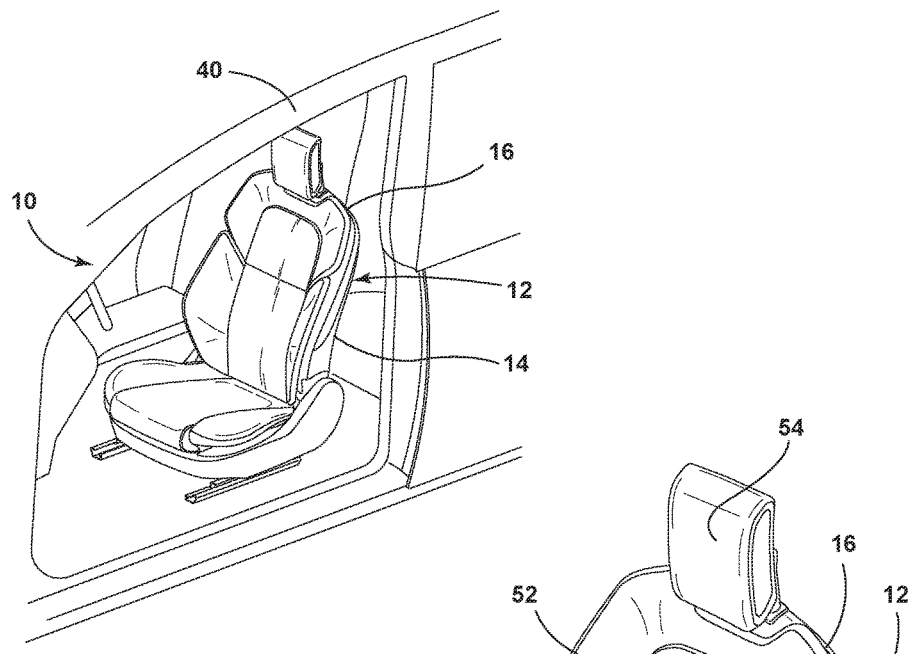
FIG. 1 is a top perspective view of one embodiment of a vehicle seating assembly of the present disclosure disposed in a vehicle.
Figure 2:
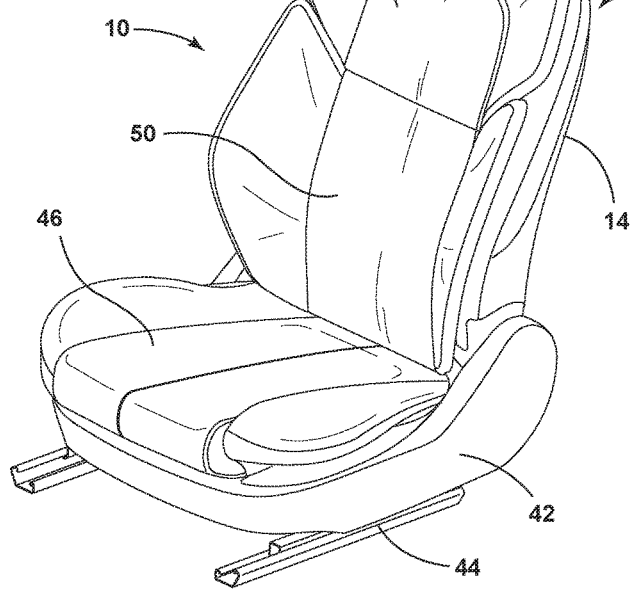
FIG. 2 is a top perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-8, reference numeral 10 generally designates a vehicle seating assembly that includes a seatback 12. A seatback panel 14 is operably coupled with a back side of the seatback 12. The seatback panel 14 includes a front side 17 and a rear side 18. Multiple laterally-extending mounting features 20 are disposed proximate edges 22 of the front side 17 of the seatback panel 14. An inner carrier 24 includes multiple clip embossments 26 extending laterally and releasably coupled with the mounting features 20. Multiple forwardly-extending clip towers 28 are spaced vertically between the mounting features 20. A cushion assembly 30 includes attachment features 32 releasably coupled with the clip towers 28. After deployment of an airbag module 34, which may be a side-impact airbag module, the mounting features 20 of the seatback panel 14 and the clip embossments 26 can be recoupled for continued use of the vehicle seating assembly 10.

With reference again to FIGS. 1 and 2, the vehicle seating assembly 10 may be used in any vehicle 40, such as a car, a truck, a van, etc. It is also contemplated that the concept set forth in this disclosure may be utilized in a front or forward position of the vehicle 40 as well as a rear or rearward position of the vehicle 40. The vehicle seating assembly 10, as illustrated, includes a seat base 42 that is positioned on rail slides 44 to allow fore and aft movement of the vehicle seating assembly 10 relative to the vehicle 40. A seat 46 is operably coupled with the seat base 42 and is movable relative thereto, as set forth in further detail below. In addition, the seatback 12 of the vehicle seating assembly 10 includes a lower lumbar region 50 and an upper thoracic region 52 as well as a head restraint 54. Each of the components of the seatback 12 may be configured for adjustability to properly support the weight of various occupants inside the vehicle 40.

Figure 3:
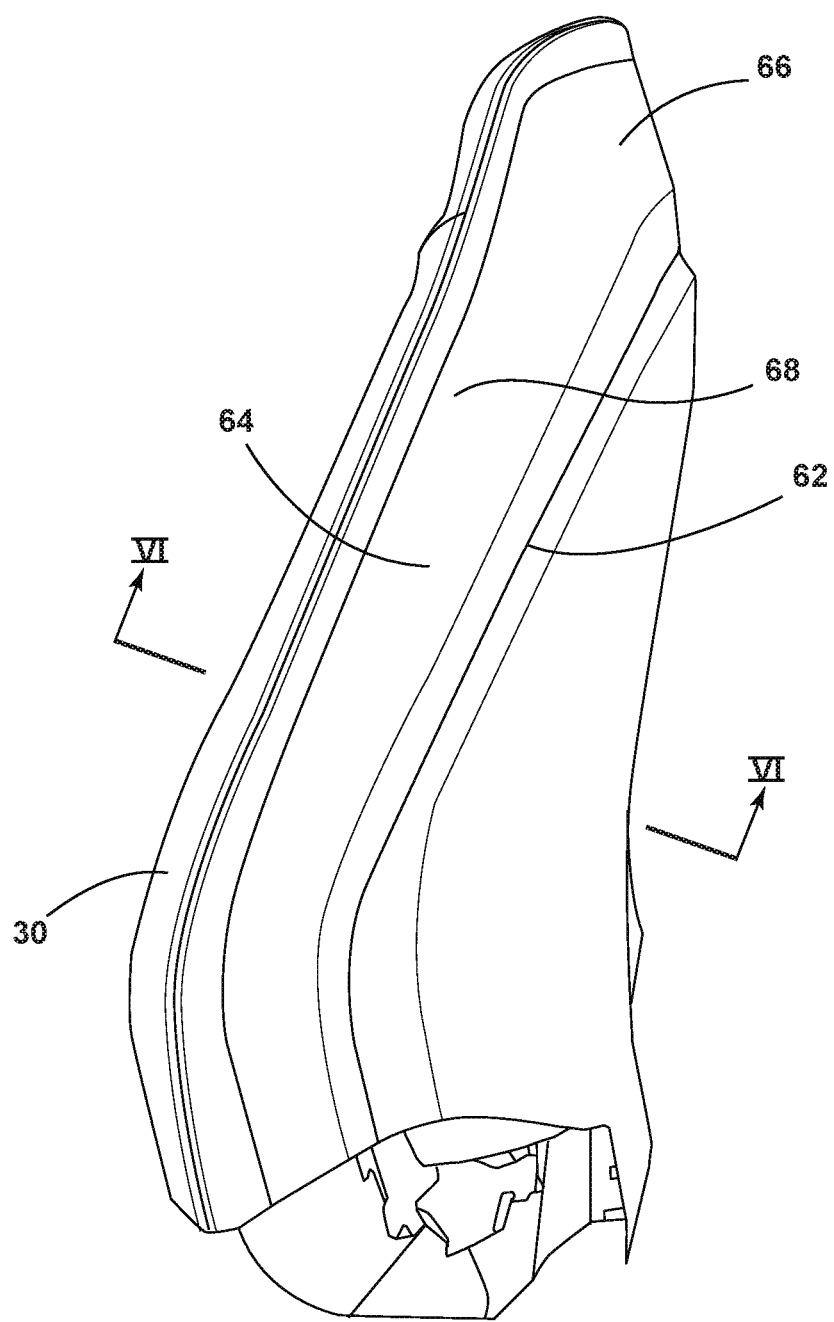
FIG. 3 is a side elevational view of a seatback of the present disclosure.

With reference to FIG. 3, the seatback 12, and more specifically, the lower lumbar region 50 and the upper thoracic region 52 are generally configured to cradle the upper and lower back of a passenger or driver. The cushion assembly 30 abuts a forward edge 70 of the seatback panel 14. The seatback panel 14 is rounded and includes a living hinge 62 that extends about sides, and a top 66 of the seatback panel 14. The living hinge 62 allows for movement of a forward portion 68 of the seatback panel 14 laterally when the airbag module 34 deploys an airbag. The forward edge 70 generally defines a side airbag deployment seam through which the side airbag will deploy during a vehicular collision.

Figure 4:
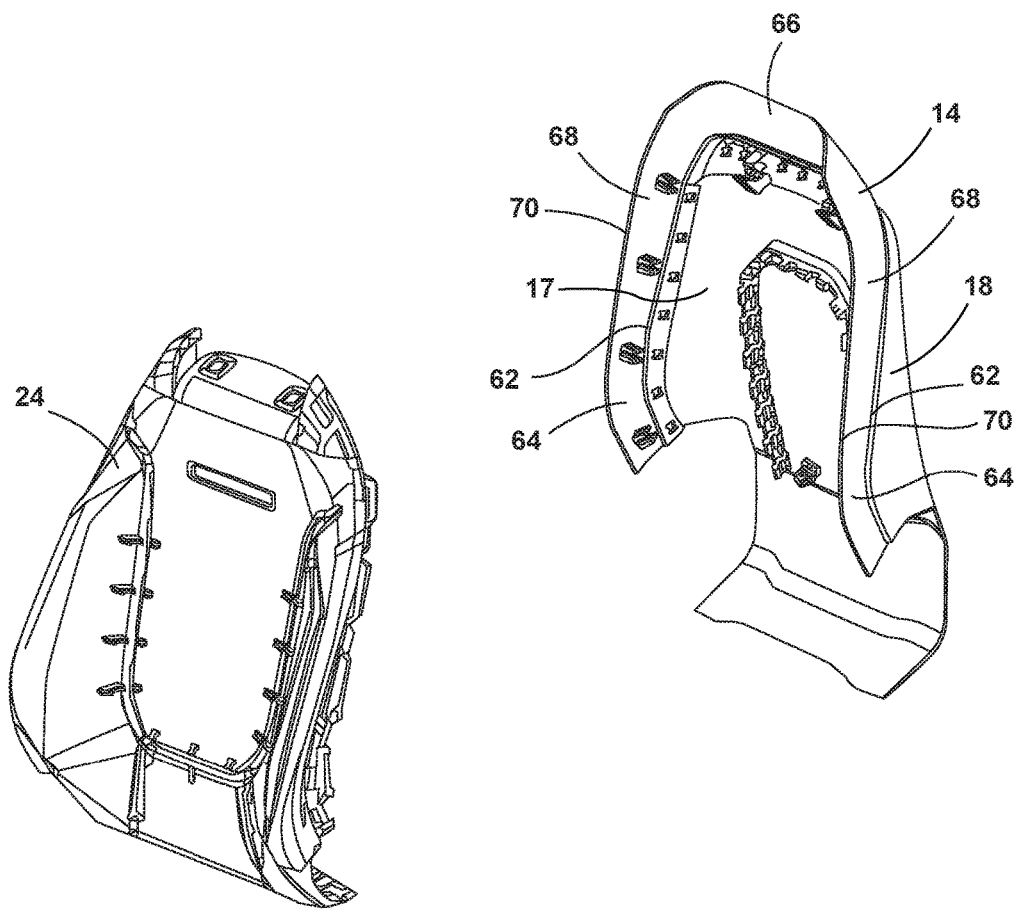
FIG. 4 is a top perspective view of a seatback panel removed from a cushion assembly of the present disclosure.

With reference now to FIG. 4, the inner carrier 24 and the seatback panel 14 are shown prior to assembly. Notably, the seatback panel 14, as illustrated, includes four mounting features 20 that are disposed proximate the edges 22 of the front side 17 of the seatback panel 14. The mounting features 20 each include an S-shaped clip 80 (FIG. 5) configured to engage the seatback panel 14. The S-shaped clips 80 also are configured to removably retain the clip embossments 26 that extend from the inner carrier 24. More specifically, the clip embossments 26 generally define bulbous carrier flanges 82 that are received by the S-shaped clips 80 of the mounting features 20. As illustrated in FIG. 4, the bulbous carrier flanges 82 are configured to fill a forward portion of the S-shaped clip 80.

Figure 5:
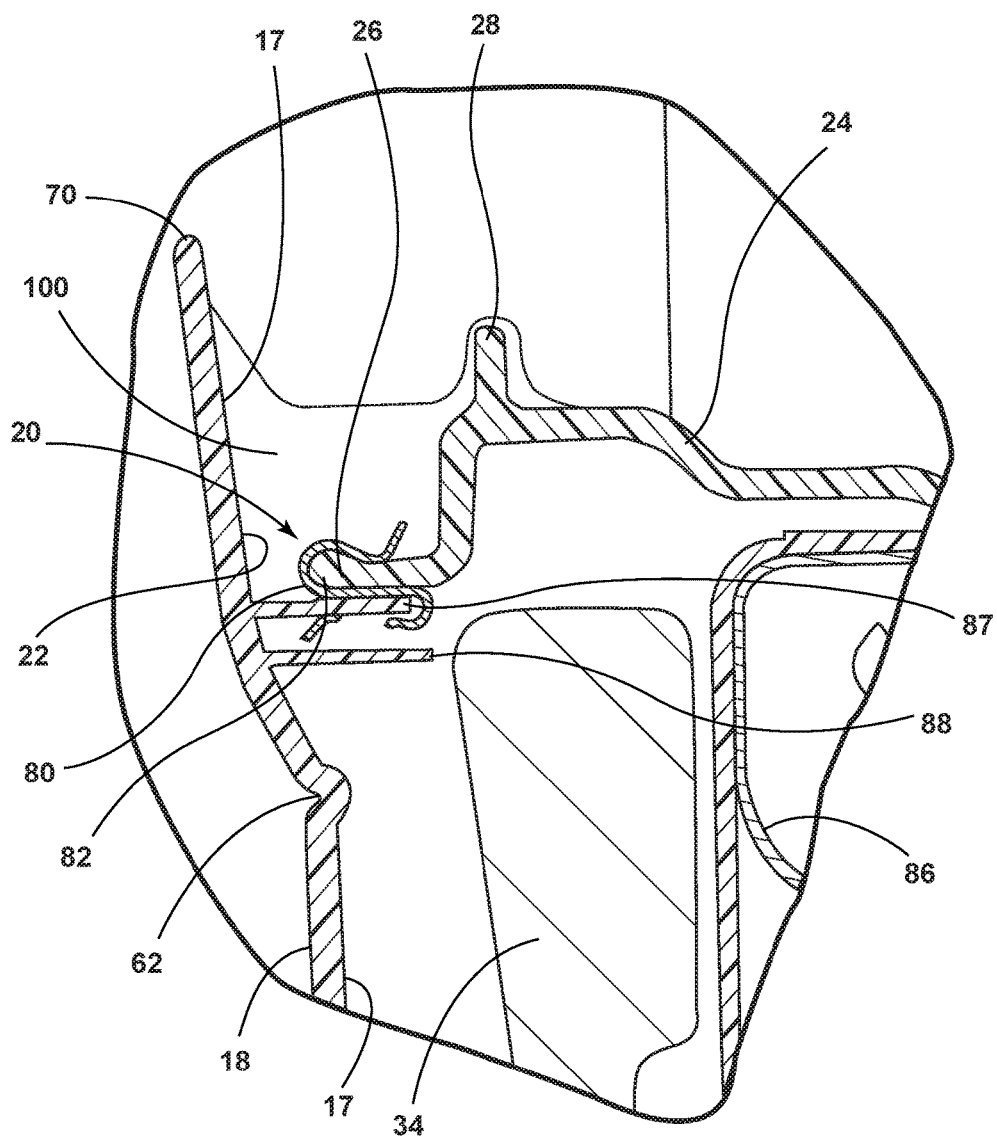
FIG. 5 is a top plan cross-sectional view of a portion of a seatback panel, an inner carrier, and a cushion assembly interface.

Notably, as shown in FIG. 5, the forwardly-extending clip towers 28 extend from the inner carrier 24 in a forward direction relative to the seatback panel 14. The forward edge 70 of the seatback panel 14 is configured to abut into a side portion of the cushion assembly 30 and also a coverstock 84 disposed on the cushion assembly 30. The inner carrier 24 and the seatback panel 14 are supported on a seatback frame 86 of the vehicle seating assembly 10. The mounting features 20 include forward and rearward walls 87, 88, one or both of which may support the S-shaped clips 80. As illustrated, a portion of the S-shaped clip 80 extends into an aperture of the forward wall 87.

Figure 6:
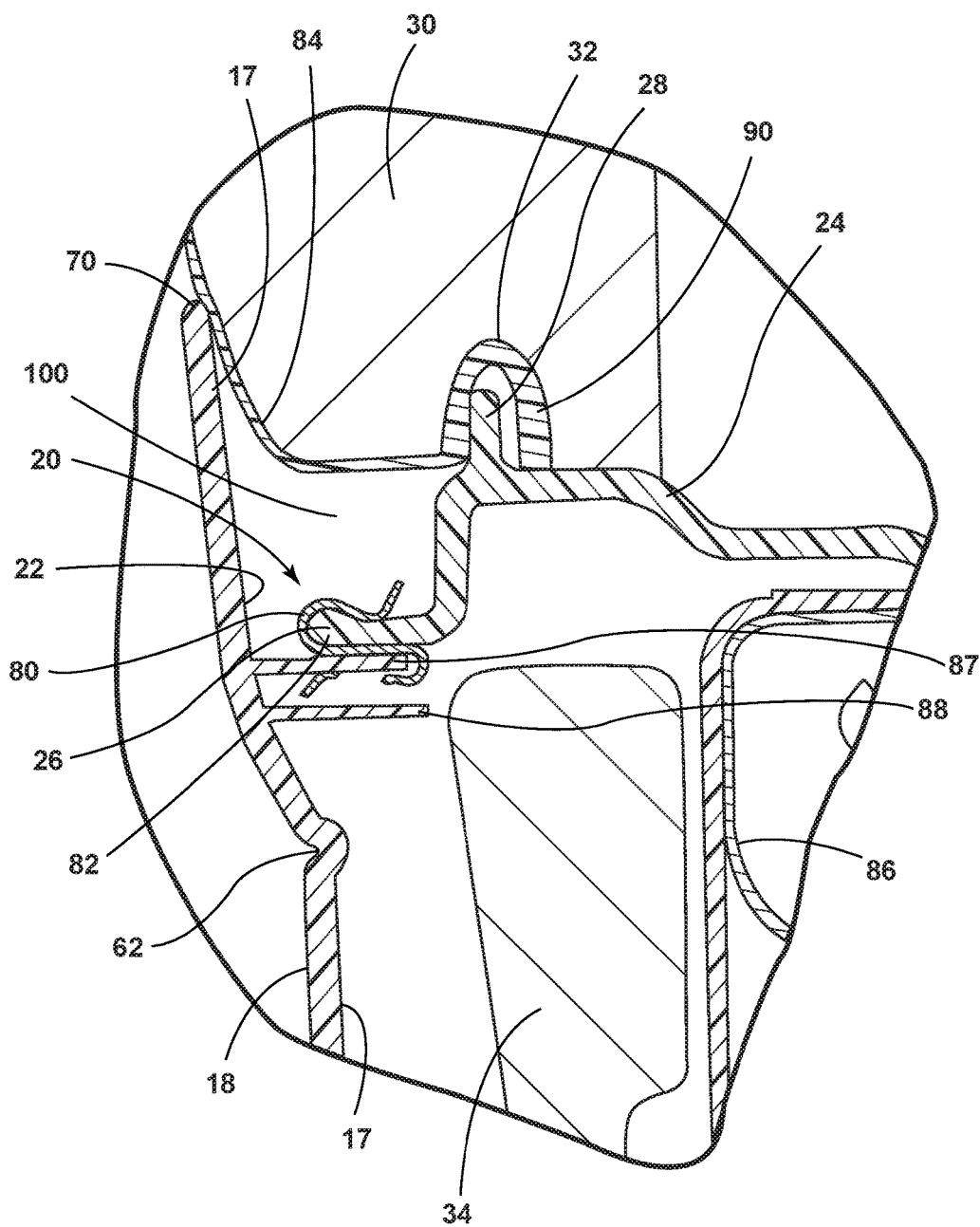
FIG. 6 is a top plan cross-sectional view taken at line VI-VI of FIG. 3, illustrating a seatback panel, an inner carrier, and a cushion assembly interface.
Figure 6A:
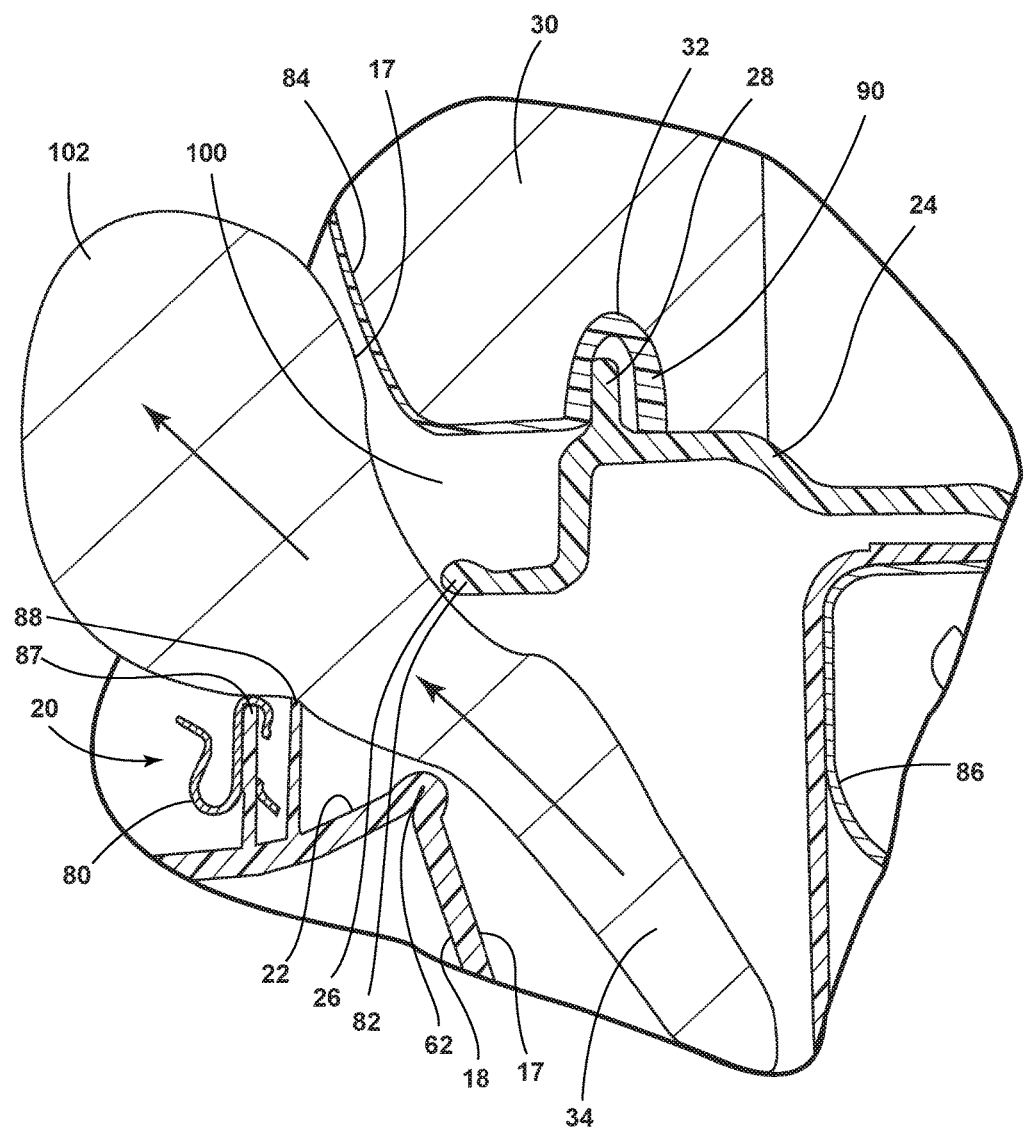
FIG. 6A is a top plan cross-sectional view taken at line VI-VI of FIG. 3, illustrating a seatback panel, an inner carrier, and a cushion assembly interface after deployment of a side airbag.
Figure 8:
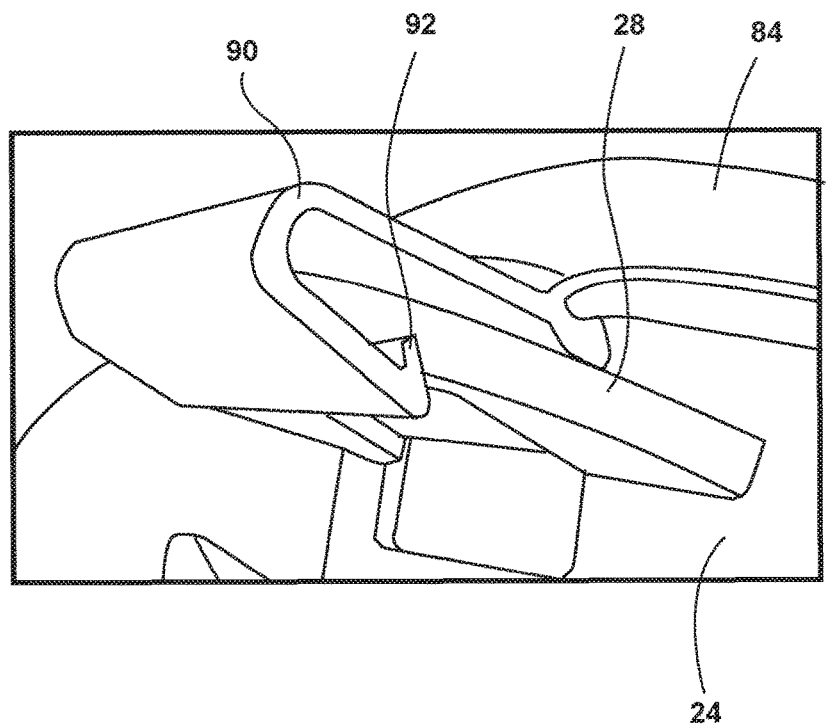
FIG. 8 is a side perspective view of one embodiment of a clip retainer engaged with a clip tower.

With reference now to FIGS. 6 and 6A, the vehicle seating assembly 10 is illustrated with the cushion assembly 30 and the coverstock 84 in connection with the inner carrier 24 and the seatback panel 14. As shown, the forward edge 70 of the seatback panel 14 pushes into and slightly deforms the coverstock 84. The clip tower 28, which extends forward relative to the inner carrier 24, is received in the attachment feature 32 of the cushion assembly 30. The attachment feature 32 is generally operably coupled with the coverstock 84 that extends around the cushion assembly 30. However, the attachment feature 32 could also be an integral part of the cushion assembly 30. The attachment features 32 each includes a retention clip 90 having a U-shaped construction and is configured to receive the clip tower 28. The retention clip 90 frictionally engages the clip tower 28, but may also include a hooked barb 92 configured to receive and securely retain the clip tower 28 (FIG. 8).

With reference again to FIGS. 6 and 6A, the S-shaped clip 80 is configured to engage the clip embossments 26 of the inner carrier 24 at least partially disposed within a space 100 defined between the inner carrier 24, the cushion assembly 30, and the seatback panel 14. During deployment of an airbag 102 by the airbag module 34, one or more S-shaped clips 80 disengage one or more of the bulbous carrier flanges 82 at each of the locations of the clip embossments 26. The S-shaped clips 80 are generally configured to maintain connection with the seatback panel 14 as the airbag deploys between the seatback panel 14 and the inner carrier 24. However, it is also contemplated that the S-shaped clips 80 could disengage the mounting features 20 and maintain connection with the bulbous carrier flanges 82 of the clip embossments 26 after deployment of the airbag 102. The airbag module 34 deploys forward at an angle adjacent to the cushion assembly 30 and the coverstock 84, as shown in FIG. 7.

Figure 7:
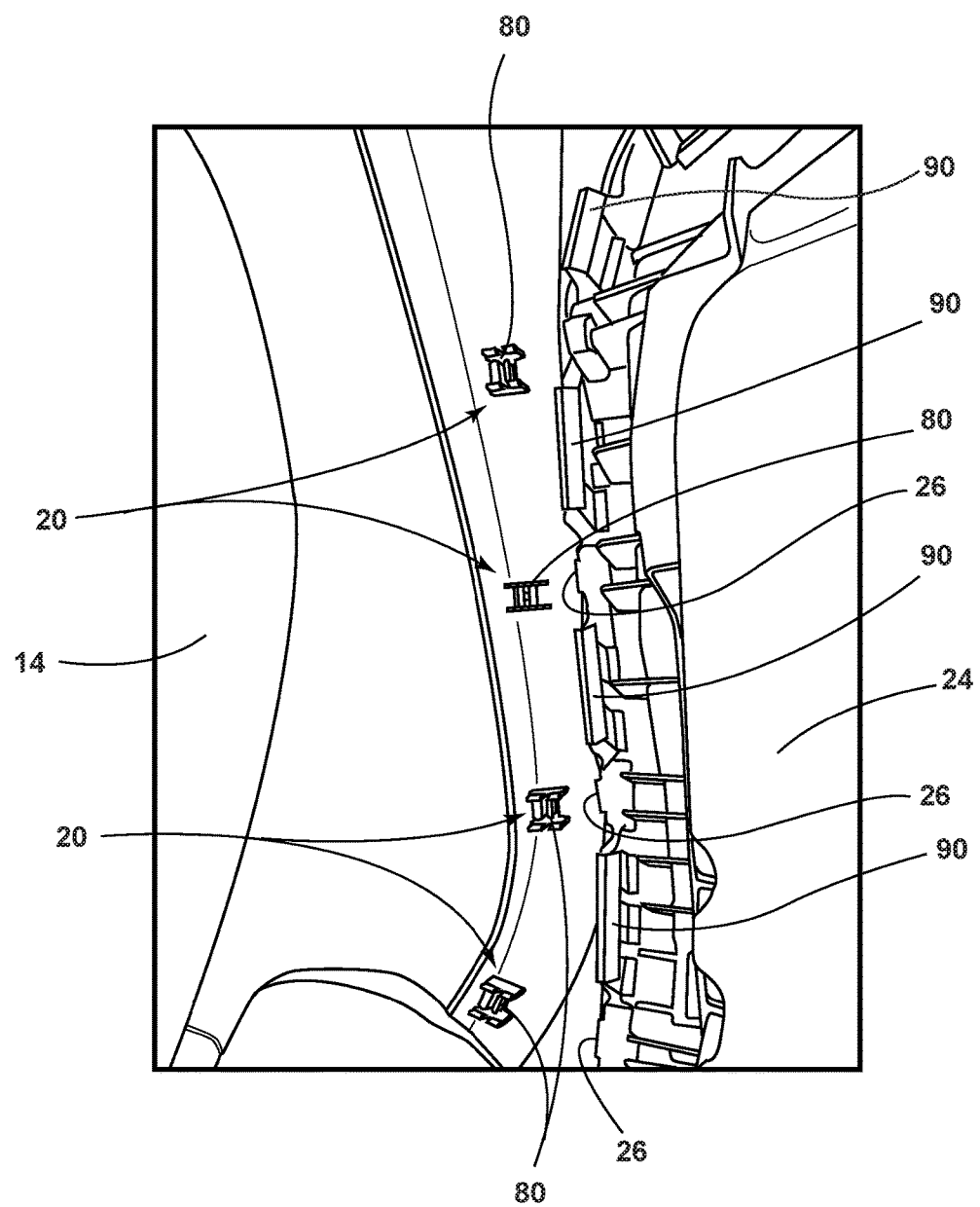
FIG. 7 is a side elevational view of a seatback panel prior to connection with and inner carrier.

With reference to FIG. 7, it is clearly illustrated how the bulbous carrier flange 82 is releasably coupled with the mounting features 20, and how the multiple forwardly-extending clip towers 28 are configured for attachment with the retention clips 90 of the attachment features 32. The seatback panel 14 may include more or less of the mounting features 20 than shown. Similarly, the inner carrier 24 may include more or less of the attachment features 32. Still further, the spacing is intermittent (e.g., two mounting features 20 per attachment feature 32, or two attachment features 32 per mounting feature 20).

As set forth herein, a safe and economical seating assembly is provided that can be reused after deployment of an airbag from an airbag module. Further, any damage done to clips or other various features of the assembly can be repaired or replaced so that the main components of the vehicle seating assembly 10 can be maintained and reused after a collision event.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seatback;
   a seatback panel operably coupled with a back side of the seatback, the seatback panel including a front side and a rear side;
   multiple laterally-extending mounting features disposed proximate edges of the front side of the seatback panel;
   an inner carrier comprising:
      multiple clip embossments extending laterally and releasably coupled with the mounting features; and
      multiple forwardly-extending clip towers spaced vertically between the mounting features; and
   a cushion assembly including attachment features releasably coupled with the clip towers, wherein after deployment of an airbag module, the mounting features of the seatback panel and the clip embossments can be recoupled for continued use of the vehicle seating assembly.

2. The vehicle seating assembly of claim 1, wherein the mounting features include S-shaped clips configured to engage the seatback panel.

3. The vehicle seating assembly of claim 1, wherein the clip embossments generally define multiple bulbous carrier flanges received by the mounting features.

4. The vehicle seating assembly of claim 1, wherein an airbag space is defined between the seatback panel, the inner carrier, and a frame of the seatback.

5. The vehicle seating assembly of claim 1, wherein each attachment feature includes a clip retainer coupled with a coverstock that extends over the cushion assembly.

6. The vehicle seating assembly of claim 1, wherein each mounting feature is configured to releasably couple the clip embossments of the inner carrier with the seatback panel.

7. The vehicle seating assembly of claim 5, wherein each clip retainer includes a U-shaped retention clip.

8. The vehicle seating assembly of claim 1, wherein the airbag module is a side-impact airbag module.

9. A vehicle seating assembly comprising:
   a seatback panel;
   multiple laterally-extending mounting features defined on first and second sides of the seatback panel;
   an inner carrier comprising:
      multiple bulbous carrier flanges extending laterally and releasably coupled with the mounting features; and
      multiple forwardly-extending clip towers spaced between the mounting features; and
   a cushion assembly including clip retainers releasably coupled with the clip towers.

10. The vehicle seating assembly of claim 9, wherein the mounting features include S-shaped clips configured to engage the seatback panel.

11. The vehicle seating assembly of claim 9, wherein the clip retainers are operably coupled with a coverstock of the cushion assembly.

12. The vehicle seating assembly of claim 9, wherein each clip retainer includes a U-shaped construction configured to receive one clip tower.

13. The vehicle seating assembly of claim 11, wherein at least one portion of each clip retainer includes a hooked barb configured to receive and retain one clip tower.

14. The vehicle seating assembly of claim 9, wherein an airbag space is defined between the seatback panel, the inner carrier, and a frame of a seatback.

15. The vehicle seating assembly of claim 9, further comprising:
   an airbag module disposed between a seatback frame, the inner carrier, and the seatback panel.

16. A method of making a vehicle seating assembly comprising:

providing a seatback panel;
defining laterally-extending attachment features on the seatback panel;
providing an inner carrier;
releasably coupling laterally-extending bulbous carrier flanges with the attachment features;
spacing multiple forwardly-extending clip towers between the attachment features;
releasably coupling clip retainers of a cushion assembly with the clip towers; and
after deployment of an airbag, recoupling the attachment features of the seatback panel with the bulbous carrier flanges.

17. The method of claim 16, further comprising:
positioning S-shaped clips on the mounting features that are configured to engage the seatback panel.

18. The method of claim 16, further comprising:
operably coupling the clip retainers with a coverstock of the cushion assembly.

19. The method of claim 16, further comprising:
forming the clip retainers to include a U-shaped construction configured to receive one clip tower.

20. The method of claim 19, further comprising:
including a hooked barb on each clip retainer configured to receive and retain one clip tower.

* * * * *